US010615654B2

(12) United States Patent
Sadiku et al.

(10) Patent No.: US 10,615,654 B2
(45) Date of Patent: Apr. 7, 2020

(54) STATOR OR ROTOR WITH INTERLACED WIRE GROUPS FORMING AN INTERTWINED WAVE WINDING (71) Applicant: Elmotec Statomat Holding GmbH, Karben (DE)

(72) Inventors: Sadik Sadiku, Neuberg (DE); Keith Witwer, Fort Wayne, IN (US)

(73) Assignee: Elmotec Statomat Holding GmbH, Karben (DE)

( * ) Notice: Subject to any disclaimer, the term of this patent is extended or adjusted under 35 U.S.C. 154(b) by 508 days.

(21) Appl. No.: 14/204,867

(22) Filed: Mar. 11, 2014

(65) Prior Publication Data

US 2014/0252908 A1 Sep. 11, 2014

Related U.S. Application Data (63) Continuation of application No. 12/423,277, filed on Apr. 14, 2009, now Pat. No. 8,667,666.

(30) Foreign Application Priority Data

Apr. 17, 2008 (DE) .................. 10 2008 019 479

(51) Int. Cl.
*H02K 3/12* (2006.01)
*H02K 15/04* (2006.01)

(52) U.S. Cl.
CPC ........... *H02K 3/12* (2013.01); *H02K 15/0478* (2013.01); *Y10T 29/49009* (2015.01); *Y10T 29/49012* (2015.01); *Y10T 29/49073* (2015.01)

(58) Field of Classification Search
CPC ................. H02K 3/12; H02K 15/0478; Y10T 29/49009; Y10T 29/49012; Y10T 29/49073

USPC ........................................................ 310/207
See application file for complete search history.

(56) References Cited

U.S. PATENT DOCUMENTS

| 3,820,728 | A | | 6/1974 | Pitt et al. | |
|---|---|---|---|---|---|
| 5,664,317 | A | | 9/1997 | Ponzio et al. | |
| 6,140,735 | A | * | 10/2000 | Kato | H02K 1/16 310/201 |
| 6,141,865 | A | * | 11/2000 | Kakutani | H02K 15/022 140/92.1 |
| 6,687,974 | B1 | * | 2/2004 | Asao | H02K 1/16 29/596 |
| 6,750,581 | B2 | * | 6/2004 | Neet | H02K 3/12 310/180 |

(Continued)

FOREIGN PATENT DOCUMENTS

EP    1 469 579    4/2004

*Primary Examiner* — Alex W Mok (57) ABSTRACT

The disclosed stator or rotor has a distributed wave winding, in which the wires are associated in pairs lying with straight segments in the same slots. Head portions of two successive straight segments of each wire of a pair protrude from opposite ends of slots. For forming two wire groups, a plurality of coil windings are simultaneously created by winding up n parallel wires with intermediate spacing onto a striplike former that is rotatable about its longitudinal axis. From each of the parallel wires one straight segment and one end turn are doubled by being bent over with the wire length of a head portion, and then head portions are formed and the wires interlaced. Finally, the two wire groups are wound onto one another and thereby intertwined with one another, and then introduced as an entire intertwined wave winding strand into the stator or rotor slots.

9 Claims, 4 Drawing Sheets

(56) References Cited

U.S. PATENT DOCUMENTS

| | | | | |
|---|---|---|---|---|
| 6,759,779 B2* | 7/2004 | Neet | | H02K 3/12 310/180 |
| 6,826,823 B2* | 12/2004 | Neet | | H02K 3/12 29/596 |
| 6,862,797 B2* | 3/2005 | Neet | | H02K 3/12 29/596 |
| 7,152,306 B2 | 12/2006 | Andersson et al. | | |
| 7,269,888 B2 | 9/2007 | Neet | | |
| 7,281,312 B2* | 10/2007 | Sadiku | | H02K 15/066 29/596 |
| 7,337,525 B2* | 3/2008 | Ueda | | H02K 15/0037 29/596 |
| 7,703,192 B2 | 4/2010 | Sadiku et al. | | |
| 2004/0261256 A1* | 12/2004 | Sadiku | | H02K 15/066 29/732 |
| 2004/0261885 A1* | 12/2004 | Sadiku | | H02K 15/0478 140/92.1 |
| 2005/0168093 A1* | 8/2005 | Higashino | | H02K 3/12 310/184 |
| 2005/0189833 A1* | 9/2005 | Liao | | H02K 3/12 310/179 |
| 2005/0258703 A1* | 11/2005 | Kouda | | H02K 3/12 310/180 |
| 2006/0006757 A1* | 1/2006 | Seguchi | | H02K 3/28 310/184 |
| 2006/0022547 A1* | 2/2006 | Sadiku | | H02K 15/0478 310/206 |
| 2006/0032040 A1* | 2/2006 | Neet | | H02K 3/12 29/596 |
| 2006/0033394 A1* | 2/2006 | Ogawa | | H02K 3/12 310/179 |
| 2006/0103255 A1* | 5/2006 | Seguchi | | H02K 3/12 310/201 |
| 2006/0226727 A1* | 10/2006 | Bramson | | H02K 3/28 310/180 |
| 2007/0018527 A1* | 1/2007 | Neet | | H02K 3/12 310/207 |
| 2007/0200449 A1* | 8/2007 | Hayashi | | H02K 15/0081 310/180 |
| 2018/0331606 A1 | 11/2018 | Sadiku et al. | | |

* cited by examiner

STATOR OR ROTOR WITH INTERLACED WIRE GROUPS FORMING AN INTERTWINED WAVE WINDING

CROSS REFERENCE TO RELATED APPLICATIONS

This application is a divisional of application Ser. No. 12/423,277, filed Apr. 14, 2009, now U.S. Pat. No. 8,667,666 issued Mar. 11, 2014 (which is hereby incorporated by reference).

FIELD OF THE INVENTION

The invention relates to a method for producing a stator or rotor, i.e., electrical elements, for electrical machines, having a distributed wave winding, the wires of which wave winding are shaped continuously in wavelike fashion into straight segments introduced into the slots of the stator or rotor and head portions, each head portion joining two adjacent straight segments of one wire and protruding past an end face of the stator or rotor, in which the head portions of wires, associated in pairs occupying the same slots, protrude from opposite ends of the slots receiving two successive straight segments of the associated wires.

The invention further relates to a stator or rotor (electrical element) of an electrical machine having slots whose width is designed for the reception of a single row of straight wire segments of rectangular cross section that are oriented parallel with their radially inner and outer side faces, and having a distributed wave winding that has two wire groups, each with n interlaced wires, shaped continuously in wavelike fashion with straight segments and gable-shaped head portions, in which the wires of one wire group are associated with the wires of the other group in pairs, in such a manner that the two wires of each pair are located in the same slots and their head portions join opposite ends of successive straight segments located in the same slots.

BACKGROUND OF THE INVENTION

The invention is based on a method described in U.S. Pat. No. 7,703,192 and the stator or rotor produced by this method which published application is hereby incorporated by reference. It provides that a distributed wave winding is assembled from two separately interlaced wire groups of preferably rectangular winding wires, in which each group is created by winding on a striplike flat former, by the intersection of the wires in the head portion regions, and by ensuing flat pressing. The two winding halves pressed flat separately in one ply at the end lie in a defined plane each in the stator or rotor slots, without being intertwined/interlaced with one another. The respective winding wires, associated in pairs and located in the same slots, of the two strands are joined only by soldering on one end. Although a double or two-ply layer formed of both winding halves located one above the other supposed to have the thickness of twice the wire thickness, at certain points three wires intersect at such close spacing that a certain lack of uniformity in thickness occurs, and this deficiency increases when there are a plurality of layers.

Distributed wave windings in which all the winding wires are interlaced with one another to form one coherent strand are described in U.S. Pat. Nos. 6,750,581 B2, 6,759,779 B2, 6,826,823 B2 and 6,862,797 B2. No production method is disclosed, but if, as is normally desired, the prefabricated wave winding shall extend multiple times about the circumference of a stator or rotor and thus form a plurality of layers, in those areas where the transition from one layer to the next takes place, an irregularity must be incorporated into the strand of interlaced wires, making production by machine more difficult.

From European Patent Disclosure EP 1 469 579 A1, it is furthermore known to produce a distributed wave winding for a stator or rotor by winding all the winding wires that form a two-ply layer parallel to one another onto a former of hexagonal cross section in a single winding operation, the former having two parallel side faces, which are provided with transverse slots and are joined on both long edges by gable-shaped end faces. The winding operation thus proceeds helically along the former, but the inclination is limited to the unslotted, gable-shaped end faces, while the winding wires in the slots of the parallel side faces extend without a slope, transversely to the longitudinal center axis of the former. Each time the parallel winding wires are wound about the former, some of the wires are placed in slots located diametrically opposite other slots that have been occupied earlier during the same winding operation. Once a certain number of windings has been reached, the multi-part former is reduced in its cross section and pulled out of the coil that has been formed. After that, the coil of hexagonal cross section is pressed flat in two plies, and the straight wire segments created on both side faces of the former are pressed against one another.

In this last-described winding method, the wires are placed continuously, with a constant inclination, onto the gable-shaped end faces of the former. Because of the residual intrinsic elasticity, however, they do not rest flat there, nor are they pressed from outside against these faces, and they are not retained in slots. The bending of the wires about the edges that define the gable-shaped end faces, in conjunction with the bending for attaining the axial inclination of the wire windings, causes torsion of the rectangular wires throughout the area of the head portion, which proves harmful in the phase between when the coil is removed from the former and the flat pressing is done. Normally, in this known winding method, the outer side face of a wire, resting on a side face of the former, should also be located on the outside over the entire length of a head portion. However, both the torsional stress in the wire and the bending edges extending obliquely to its longitudinal edges cause twisting about the longitudinal axis of the wire and bends, so that upon the flat pressing, the wire portions located one above the other or intersecting one another are in part pressed with their side edges instead of with the side faces, against one another, and the parallel course of the wires in the head portion region is not assured, either.

BRIEF SUMMARY OF THE INVENTION

It is therefore the object of the invention to make a stator or rotor of the type defined at the outset available that has an entirely intertwined/interlaced, distributed wave winding with a uniform wire course and a minimal two-ply layer thickness, in the head portions as well, and to make a suitable production method available for such a stator or rotor.

The above object is attained in terms of the method in that for forming two wire groups, initially interlaced separately and then intertwined/interlaced with one another, in each case a plurality of coil windings are simultaneously created by winding up n parallel wires, paid out from a wire guide, with intermediate spacing onto a striplike former that is rotatable about its longitudinal axis, in that for a stator or rotor having a number of slots divisible by 2 n, that are to be occupied by the wave winding, in alternation in a work step A, from each of the parallel wires on the former having a predetermined intermediate spacing corresponding to the spacing of the stator or rotor slots, one straight segment and one end turn, doubled by being bent over and having the wire length of a head portion are created; and in a work step B, the straight segments formed in work step A, while maintaining their intermediate spacing, together with the adjoining first end of the respective associated end turns, and the wire guide, together with the second end of these end turns are displaced axially along the axis of rotation of the former relative to one another by n times the predetermined intermediate spacing in a predetermined direction and as a result head portions are formed;

until after multiple repetition of work steps A and B, the straight segments for the last n stator and/or rotor slots are also created on the former;

and then the two individually prefabricated interlaced wire groups are wound onto one another in an axial relative position in which the straight segments created from associated wires on opposite sides of the striplike former are made to coincide, and in this state are introduced as an entire coherent wave winding into the stator or rotor slots in the direction transversely to their longitudinal extent.

The invention offers the advantage that the wave winding can be assembled from two wire groups that are to be prefabricated each in one ply, with straight segments offset transversely from the central plane, and [the wire groups can then be intertwined/interlaced] with all the wires. The head portions alternatingly jump from a radially inner ply to a radially outer ply and back again and thus rest obliquely to the circumferential direction of the stator or rotor. Nevertheless, the wires are bent only locally at the transitions from the straight segments to the head portions and at the apexes thereof, specifically preferably only about bending axes extending longitudinally of the strand and transversely thereto. In this way, rectangular wires too can be aligned uniformly in the head portions, so that after assembly, they point radially outward and inward with diametrically opposed side faces. By the deformation at the apex of the head portions, which has the effect that in top view on one side of the apex one side face and on the other side the diametrically opposed side face of the rectangular wire forms the outer face of the head portion, the wire becomes plastically deformed and after that maintains its shape.

In a preferred feature of the invention, each of the two wire groups that are interlaced separately has from two to five times as many straight segments as the stator or rotor has slots, and after both wire groups have been intertwined by winding upon one another the combined strand has a continuous structure and pattern between the respective second and next-to-last straight segments, such that the head portions of two associated wires that are intended for the same slots intersect, upon each progression from one slot to the next, in projection onto a plane located transversely to the longitudinal direction of the slots. This method is favorable from a manufacturing standpoint, since the wave winding can be continuously uniformly shaped, without the discontinuity shown for instance in U.S. Pat. No. 6,750,581 B2 at the transition from one two-ply layer to the next.

Normally [U.S. Pat. No. 6,750,581 noted above], each wire group interlaced separately will be pressed flat individually with n wires, and then the two wire groups will be wound one above the other. However, the possibility also exists of first winding the two wire groups, which have been prefabricated as flat as possible: one above the other and then to press them flat while in mutual contact.

A stator or rotor produced by the method described above is also provided. It is distinguished by a precisely parallel orientation not only of the side faces radially adjoining one another of the straight segments but also of the head portions at the intersections, as well as by their precise positioning, so that the thickness measured in the radial direction of a two-ply wire layer is no greater in the region of the head portions than in a slot.

BRIEF DESCRIPTION OF THE DRAWINGS

Below, one exemplary embodiment of the invention is described in further detail in conjunction with the drawings.

DETAILED DESCRIPTION OF THE INVENTION

Figure 1:
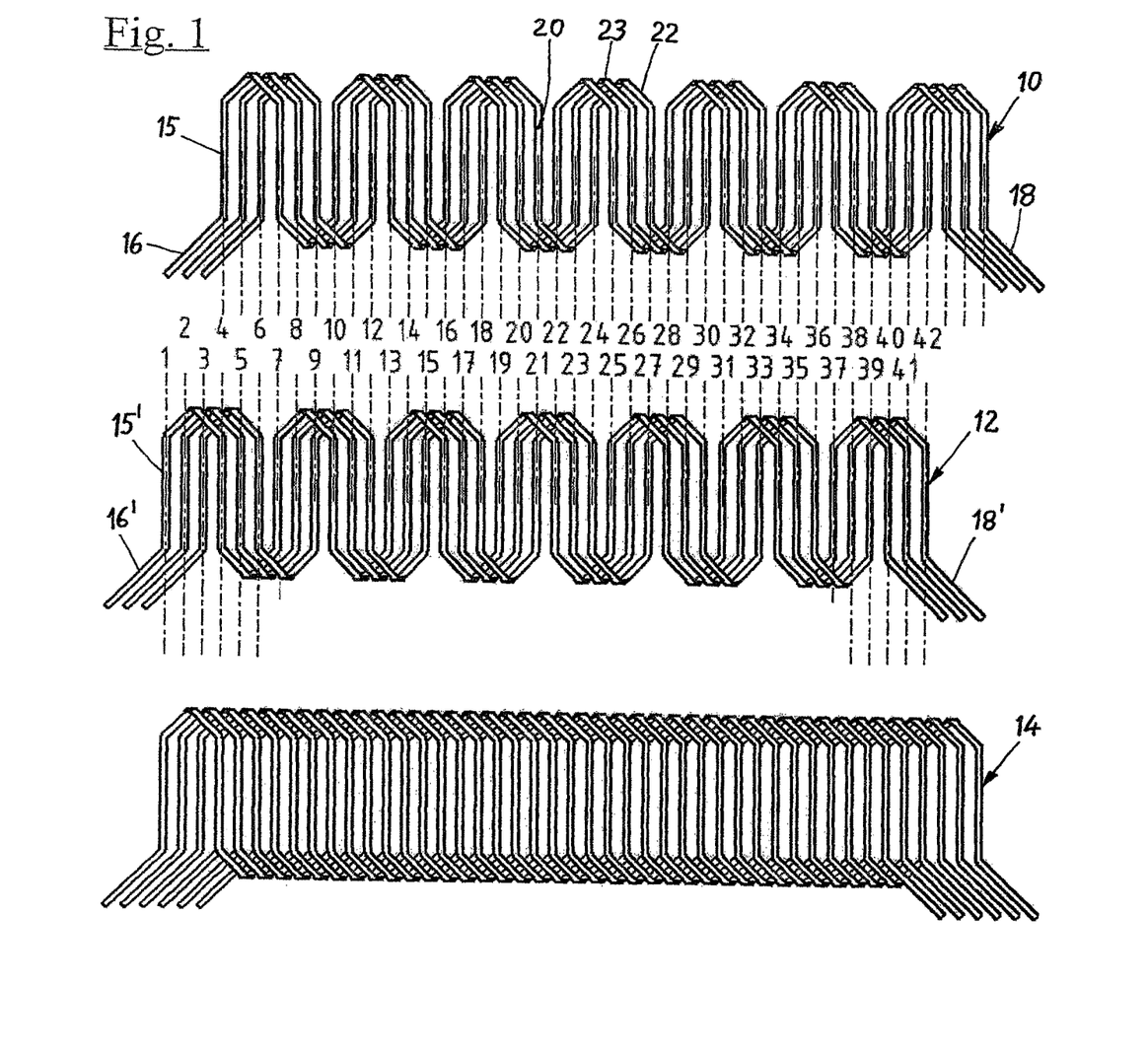
FIG. 1 shows two individually prefabricated, wave-shaped wire groups interlaced separately, in a side view, each comprising three wires, for a distributed wave winding of a stator having 42 slots, as well as a side view of a wave winding, assembled by intertwining the two wire groups by winding them onto one another, in the flatly spread-out state.
Figure 4:
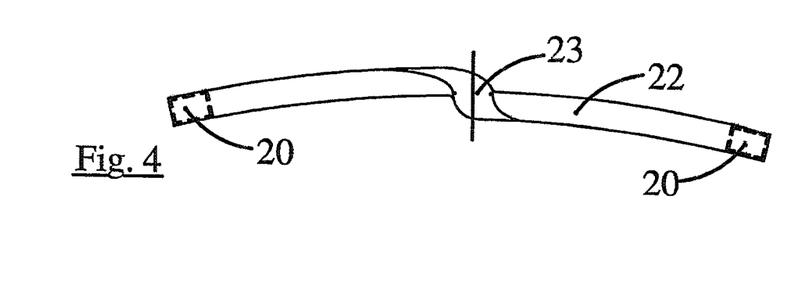
FIG. 4 is an axial top view onto a head portion of one of the wire groups of FIG. 1, after being introduced into a stator, on a greatly enlarged scale.
Figure 6:
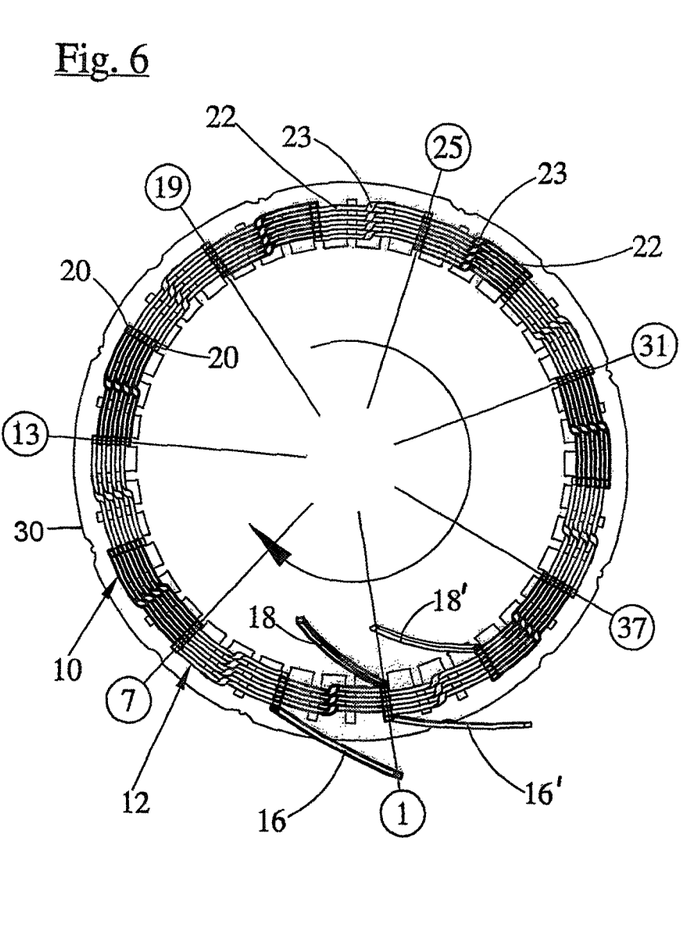

As shown in FIG. 1, first, two wire groups 10 and 12, comprising parallel wires formed and interlaced with one another, are produced, which are then put together and intertwined by winding onto one another to form a wave winding identified in its entirety by reference numeral 14, which is introduced into a stator or rotor, i.e., an electrical element for an electrical device hereafter exemplarily depicted as stator 30 in FIGS. 4 and 6.

The two wire groups 10 and 12, in this example, match identically, but may also have differently shaped head portions. They each comprise three parallel wires 15, 15' whose beginnings are marked 16 and 16' and whose end is marked 18 and 18', respectively. In each of the two wire groups 10, 12, the three wires 15, 15' extend in wavelike fashion between their respective beginning and end and in the process form rectilinear straight segments 20, to be introduced into the stator or rotor slots, and head portions 22 which join two adjacent straight segments 20 of the same wire at the ends. In the finished state of a stator, the head portions 22 protrude past the face ends of the stator lamination packet.

Each wire group 10 and 12 is shaped in wavelike fashion, in that the three wires 15, 15' as described in U.S. Pat. No.

Figure 2:
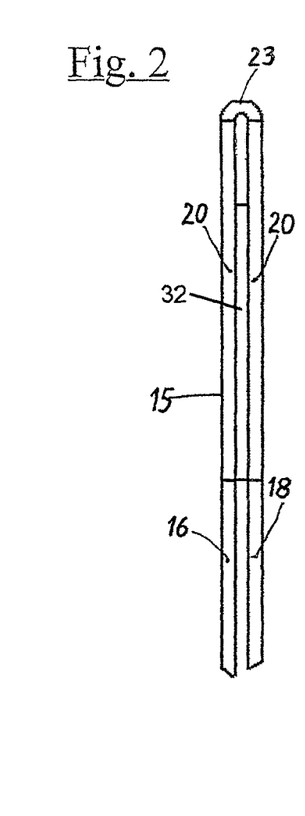
FIG. 2 is an end view of one of the wire groups of FIG. 1, on a larger scale.

7,703,192 (see especially FIGS. 10A-10I), are wound simultaneously and parallel to one another onto a rotationally drivable flat or striplike former 32 shown in FIG. 2 (or, see similar former 20 in the above noted reference), which also includes two retractable bolts (see #26 in U.S. Pat. No. 7,703,192) that form the head portions 22, During the winding motion, which is done with interruptions (periods when no winding occurs), the wire guide (see #30 in U.S. Pat. No. 7,703,192) is axially fixed relative to the former, but each time the wires 15 have been guided about one of the aforementioned bolts and as a result the bend at the apex of three end turns, which thereafter become head portions 22, has been shaped, the wire guide and the former, after the retraction of the bolt, are axially displaced relative to one another, and thereby the legs of the end turns are spread apart to form the head portions 22. It can be seen from FIG. 1 that in the head portions 22 the legs now are in an intersecting or crossing over position. It can also be seen from FIG. 1, that the first wire 15 of the upper head portions crosses over the two other parallel wires 15, and the middle wire 15 crosses over the third wire 15. The situation is a reverse in the lower head portions 22, There, the third wire 15 crosses over the first and second wires 15, and the middle wire 15 crosses over the first wire 15. In this way, after being stripped from the flat former 32, the three wires 15 are interlaced with one another and can be handled as a single coherent wire group or strand 10 and 12, respectively.

The flat, striplike former 32, for reasons of strength, has a certain thickness. But in the case of the wave winding to be produced in accordance with U.S. Pat. No. 7,703,192, all the straight segments 20 of one wire group 10 or 12 should be located in the same flat plane. This is desired so that later in the radial slots of a cylindrical stator or rotor, the straight segments will be located at the same radius. To achieve this the wire groups 10, 12, after the wavelike shaping on the former 32, are pressed as flat as possible into a common plane. But normally this flat pressing is not entirely successful, since the intersecting (cross over) points of the wires in the head portions 22 are an obstacle to this flat, pressing.

In the known method of U.S. Pat. No. 7,703,192 the two flat-pressed wire groups 10 and 12 are simply placed one above the other in the longitudinal direction with the offset shown of their beginnings 16, 16' and ends 18, 18'. In this simple layering they are introduced in the manner described for instance in U.S. Pat. No. 7,281,312 B2 and shown in FIGS. 8 through 11 thereof into a stator or rotor that has slots open radially inward.

However, the present invention is distinguished over this prior art in that the wire groups 10 and 12, normally also after a flat-pressing operation, are intertwined/interlaced with one another in the relative position shown in FIG. 1 by intertwined wave winding 14. This intertwining of wire groups 10 and 12 is accomplish d by being wrapped around one another, so that the entire wave winding 14 is one coherent wire group or strand, which can then in accordance with U.S. Pat. No. 7,281,312 B2 be introduced into a stator lamination packet. Winding the two wire groups 10 and 12 around one another is necessary in order to make respective paired straight segments 20 of the wire groups 10 and 12 coincide. For instance, the first three straight segments 20 in FIG. 1—beginning at the left—of the wire group 10 that have been shaped on the back side of the flat former 32 are made to coincide with the fourth, fifth and sixth straight segments of the wire group 12. These three last-mentioned straight segments have been shaped on the front side of the flat former 32. Once the straight segments 4 through 6 of the wire group 12 have been placed on the straight segments 1 through 3 of the wire group 10, the wire group 10 must be placed onto the top side of the wire group 12 by means of a winding step, in order to place the straight segments 4 through 6 of the wire group 10 onto the straight segments 7 through 9 of the wire group 12. Next, by a further winding motion, which is very easily done by hand, but can also be done using a very flat former, the wire group 12 is placed over the wire group 10, in order to place the straight segments 10 through 12 of the wire group 12, shaped on the front side of the former onto the straight segments 7 through 9, counted from the left, of the wire group 10 that have been shaped on the back side of the former.

It can easily be seen that after all the straight segments of the wire groups 10 and 12 have been superimposed on one another (intertwined), an optimally thin two-ply layer of the wave winding 14 is obtained. If the straight segments 20, shaped in accordance with FIG. 2 initially with a certain intermediate spacing corresponding to the thickness of the former 32, have been moved closer together by pressing the wire groups 10 and 12 flat enough, they are then directly side by side, with no spacing between them, as shown in the end view of FIG. 2. In the intertwined/interlaced state of the two wire groups 10 and 12, the result is then a two-ply layer, which is precisely as thick as two straight wire segments 20 located flat one above the other. Since the head portions 22 extend obliquely between the two plies, this two-ply layer is no thicker, even in the region of the head portions.

The wave winding selected as the exemplary embodiment in FIG. 1 is intended for a stator 30 having 42 slots. It is understood that by the same production method, a distributed wave winding with two wire groups each with only two wires, but also with for instance from four to eight or even more wires per group, can be produced. It is recommended that, as shown in FIG. 1, the two wire groups 10 and 12 be superimposed offset in the longitudinal direction by the number of wires of each group and that the wire ends 18 and 18' be connected electrically to one another, so that the current in both straight segments located in the same slot has the same direction, and the beginnings 16 and 16' of the wires 15, 15' are located directly side by side on the same side of the stator 30.

Figure 3:
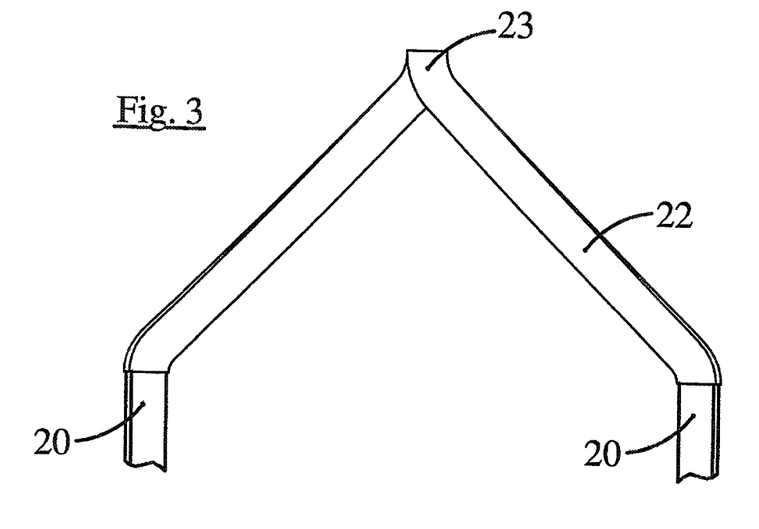
FIG. 3 is a side view of a head portion of one of the wire groups of FIG. 1, on a greatly enlarged scale.

FIGS. 3 and 4 show a head portion 22 in side view and top view, respectively, on a larger scale. It can be seen that the wire 15 has first been bent over onto itself by 180°. After that, the two legs of the head portion 22 have been spread, so that at the bending point, a lateral bend about an axis located essentially transversely to the first bending axis has also been made. The bending operations at the apexes, marked 23, of the gable-shaped head portions 22 result in a plastic deformation so that the attained shape is preserved. In addition, FIG. 4 clearly shows that the thus-deformed head portions 22 are naturally, like the straight segments 20 joined by them, located in two directly adjacent plies. The transition between the two plies is located at the apex 23 of the head portions 22.

In the exemplary embodiment of FIG. 1 the wire groups 10 and 12 and the wave winding 14 put together from them have only so many straight segments that with them, in a stator with 42 slots, only a single two-ply layer can be produced. In other words, each wire 15 extends only once around the circumference, and there are only two straight segments in each slot.

FIGS. 5 through 8 additionally show a four-ply winding diagram for a stator 30, also with 42 slots, in which for the sake of simplicity only a single pair of wires 15, 15' is shown, which pair is located in the slots 1, 4, 7 . . . 37, and 40. The complete distributed wave winding actually also includes a second pair of wires 15, 15', which is located in the slots 2, 5, 8 . . . 38, and 41, as well as a third pair of wires 15, 15', which is located in the slots 3, 6, 9 . . . 39, and 42. By comparing the two end views of the stator 30 in FIGS. 5 and 6, it can be seen that on each of those circumferential portions where the head portions 22 of one wire (e.g., 15) are located on one end, the other wire (e.g., 15') has its head portions 22 on the other end of the stator 30. The wire beginnings 16 and 16' emerge radially outward from the slots 1 and 4. The wire ends 18 and 18' protrude radially inward from the slots 1 and 40, respectively, and are located on the same axial end of the stator 30 as the wire beginnings 16, 16'. They have a short circumferential spacing and can therefore easily be electrically connected to one another, so that in the finished state, for each pair of wires 15, 15' associated with one another, only two external connections or terminals are needed.

Figure 5:
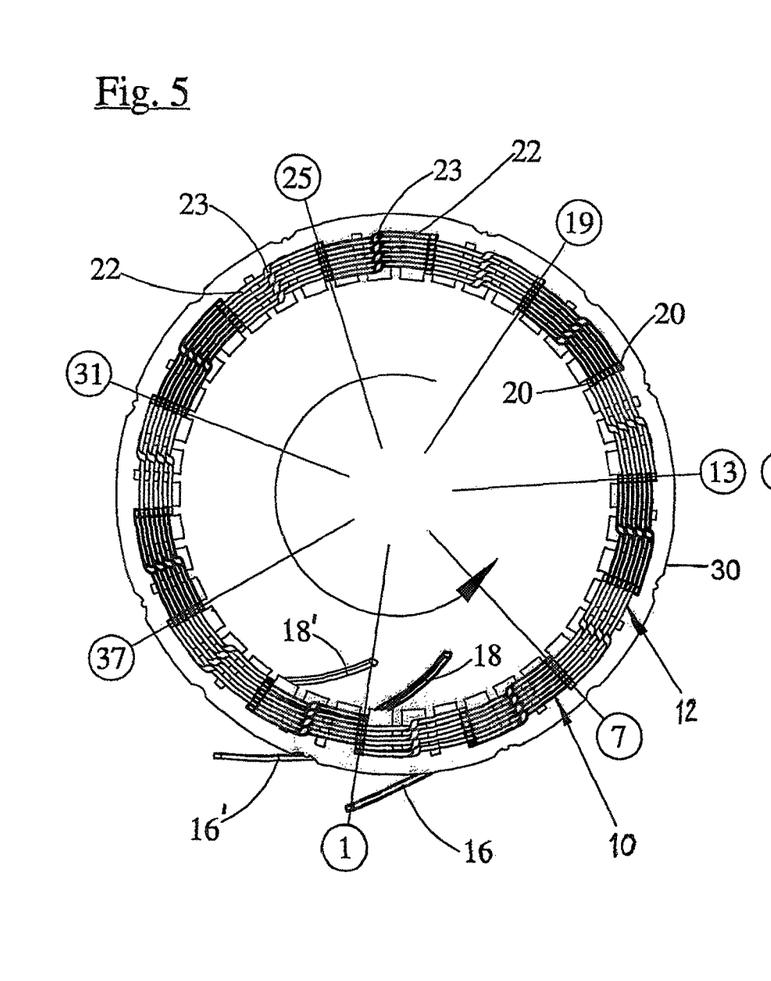
FIGS. 5 and 6 are top views on the face ends of a stator having 42 slots after the insertion of one of three pairs of wires of a distributed wave winding that extends two times around the circumference and forms two double layers.
Figure 7:
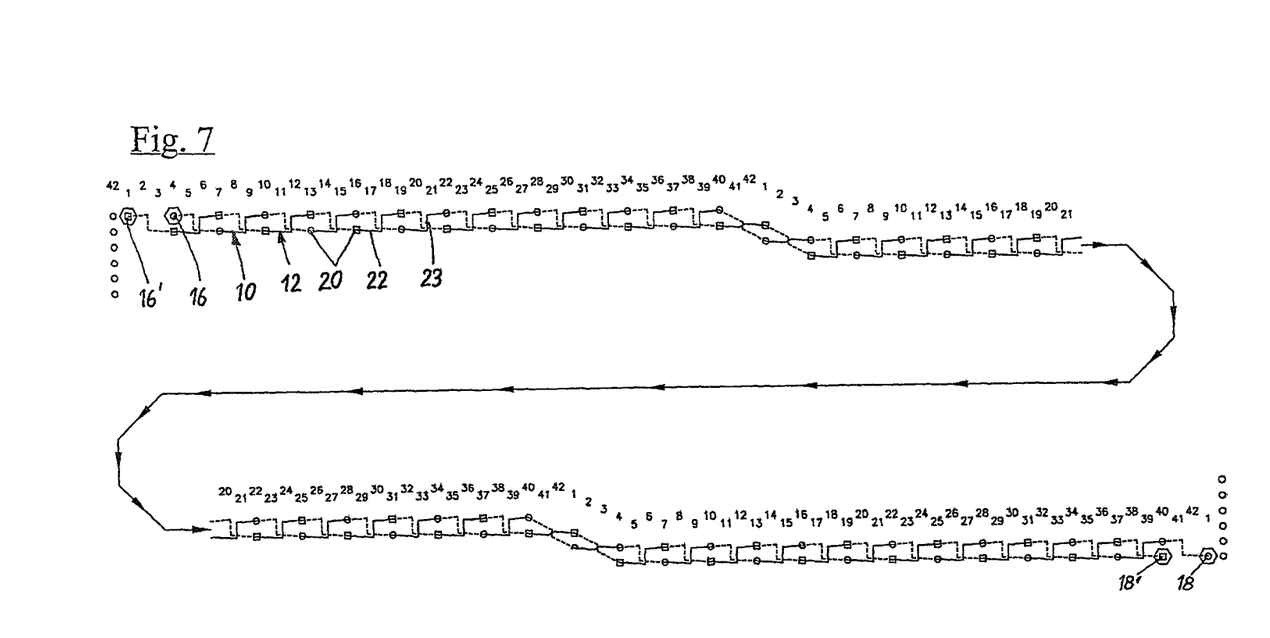
FIG. 7 is a winding diagram of a three-layer distributed wave winding of a pair of wires for a stator with 42 slots, in a developed view.

FIGS. 5 and 6 already show the uniform shape of the head portions 22 in all the layers over the entire circumference on both ends of the stator 30. This uniformity, even at the transitions from one two-ply layer to the next, can be explained in conjunction with FIGS. 7 and 8. FIG. 7 shows a developed view, that is, the stretched-out outset state of a wave winding 14 of the invention, here comprising only a single pair of associated wires, or in other words FIG. 7 shows the same situation as in FIGS. 5 and 6. The numbers of the slots are indicated for three passes all the way around the circumference of the stator. Small circles represent straight segments of the wire 15 of group 10, and small squares represent straight segments of the wire 15' of group 12. It can be seen that between slots 4 and 7 a solid line connects the straight segments, marked with a square, of the wire 15' of group 12. Looking toward the face end of the stator 30 shown in FIG. 6, these are the head portions 22, marked by thin lines, between the slots 4 and 7. At the same time, in FIG. 7, a dashed line connects the straight segments, marked by small circles, of the wire 15 of group 10, which is represented by only a single wire. Thus the head portions 22, which are not visible looking toward the face end of the stator 30 shown in FIG. 6, are made apparent on the other end of the stator 30. Accordingly, in FIG. 5, between slots 4 and 7, the head portions of the wire group 10 are shown, marked with heavier lines.

Figure 8:
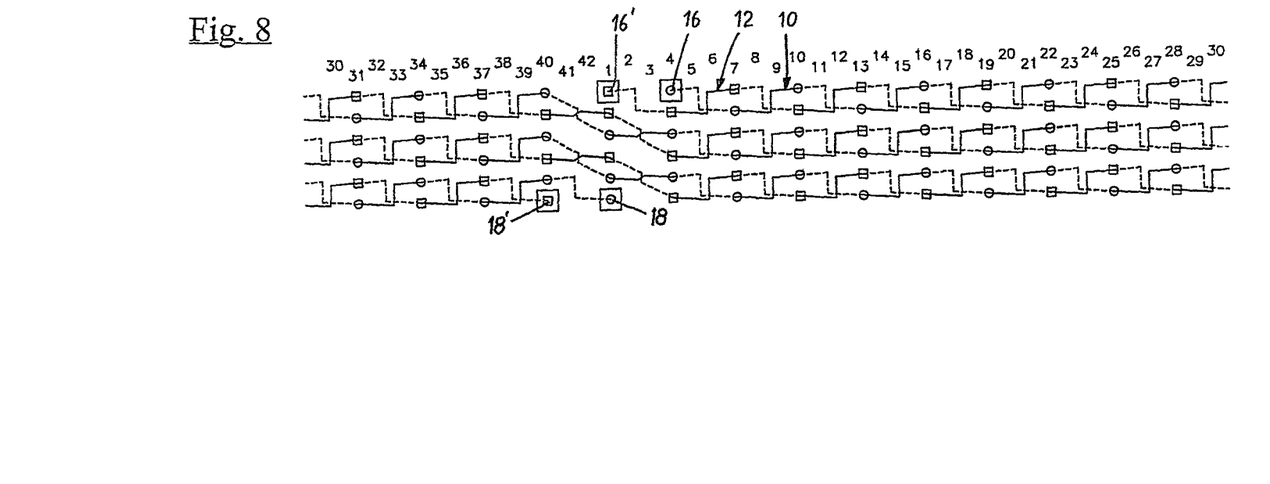
FIG. 8 is the winding diagram of the distributed wave winding of FIG. 7 after the introduction, in three two-ply layers, into a stator.

Thus FIGS. 7 and 8 show developed views of projections of the head portions 22, located on the opposite ends of the stator 30, onto a transverse plane of the longitudinal center axis of the stator 30. The solid lines symbolize the head portions 22 on the connection side of the stator 30 that are visible to the observer in FIG. 6, and the dashed lines symbolize the head portions 22 which are invisible to the observer on the opposite face end of the stator 30. Both in the developed view of three two-ply layers in FIG. 7 and in the view in FIG. 8, where the three two-ply layers are shown one above the other, it can be seen that the solid lines and the dashed lines alternate and intersect. It should be stressed especially that even where the transitions from the first to the second layer and from the second to the third layer are located, the solid lines and the dashed lines, which symbolize the head portions 22 on axially opposite circumferential portions of the stator 30, intersect and alternate quite regularly, in a way that is no different from how they behave in the other circumferential portions as well. The uniformity of the winding diagram of FIGS. 7 and 8 is confirmation of the fact that wire groups 10, 12 are uniformly wavy and uniformly interlaced separately and intertwined/interlaced with one another, regardless of the number of wires 15, 15' and the number of slots. As long as the number of slots is divisible by twice the number of wires of one wire group, a very uniformly wound stator or rotor as in FIGS. 5 and 6 can be created.

For the industry, the precision of shaping and laying of the wires is just as important as the uniformity of the winding diagram of FIGS. 7 and 8. Therefore these wires intersect one another only at the predetermined points and are oriented uniformly with their rectangular cross section, or in other words are placed against one another flatly and not skewed. This can be attained with the proposed production method, with two individually prefabricated, single-ply wire groups 10, 12, in which, because of the described shaping of the apexes 23 of the head portions 22, both the head portions and the straight segments 20 can be created with a uniform orientation of the side edges of the wires 15. After that, it is no problem for the straight segments and head portions, in this way oriented precisely, of the two wire groups 10, 12 to be placed, intertwined/interlaced with one another, one above the other and then, while maintaining the uniform orientation of the wires, to introduce them into slots of a stator or rotor that are open radially outward or inward. This may also, in extreme, for instance be a stator or rotor of an electric linear motor.

We claim:

1. A cylindrical stator or rotor of an electrical machine having slots whose width is designed for the reception of a single row of straight wire segments of rectangular cross section that are oriented parallel with their radially inner and outer side faces, and having a distributed wave winding, which has two groups each with n wires, shaped continuously in wavelike fashion with straight segments and gable-shaped head portions, wherein the two groups of wires of said wave winding have been formed by continuously winding onto a striplike, flat former with their straight segments and gable-like heads, in which the wires of one group are associated with the wires of the other group in pairs in such a manner that the two wires of each pair are located in the same slots and their head portions join opposite ends of successive straight segments located in the same slots, wherein the wires are interlaced with one another and the apexes of the gable-shaped head portions of the wires are bent outward or inward by 180 degrees relative to the central axis of the stator or rotor in a way that the apexes of the gable-shaped heads are plastically deformed in a way that they maintain their shape after bending, and in addition, the two legs of the head portions are bent, depending on their width when spread apart, in opposite circumferential directions in such a manner that opposed side faces of a wire form the axially outer face of a head portion and in an axial top view onto a head portion, the two adjoining straight segments in their respective slots assume radially different positions, and the two wire groups are wound about one another in a relative position in which the straight segments of the wires associated in pairs, in the successive slots occupied by each of them, alternatingly assume the radially outer and the radially inner position.

2. The rotor or stator as defined by claim 1, wherein the wires associated in pairs extend at least twice around the circumference of a stator or rotor and in the slots, immediately adjacent one another, form more than one double layer, and that in the region of a transition from one layer to the next as well, the straight segments of the two wires associated in pairs, in the successive slots, alternatingly assume a farther inward and a farther outward position, so that the two head portions, which join the diametrically opposed ends of the straight segments located in two successive slots, intersect in a projection onto a face located transversely to the longitudinal center axis of the stator or rotor.

3. The stator or rotor as defined by claim 1, wherein the two wire groups match in length and shape and are interlaced by being wound around one another in the relative position in which the ends of the wires associated in pairs have the least spacing on the same face end of the stator or rotor.

4. The stator or rotor as defined by claim 1, wherein the two groups when interlaced form one coherent wire group or strand.

5. The stator or rotor as defined by claim 4, wherein an orientation of the straight segments in the one coherent wire group or strand is uniform.

6. The stator or rotor as defined by claim 4, wherein the two groups is configured to be introduced into the slots of the stator or rotor as one coherent wire group or strand.

7. The stator or rotor as defined by claim 1, wherein the two groups are interlaced with one another by alternately placing the one group on top of the other group.

8. The stator or rotor as defined by claim 7, wherein the one group on top of the other group is alternated every n straight wire segments.

9. The stator or rotor as defined by claim 1, wherein the head portions are arranged in a uniform shape in all layers over the entire circumference of both ends of the stator or rotor.

* * * * *